United States Patent [19]

Kopec, Jr. et al.

[11] Patent Number: 5,111,423

[45] Date of Patent: May 5, 1992

[54] PROGRAMMABLE INTERFACE FOR COMPUTER SYSTEM PERIPHERAL CIRCUIT CARD

[75] Inventors: Stanley J. Kopec, Jr., San Jose; Yiu-Fai Chan, Saratoga; Robert F. Hartmann, San Jose, all of Calif.

[73] Assignee: Altera Corporation, San Jose, Calif.

[21] Appl. No.: 222,565

[22] Filed: Jul. 21, 1988

[51] Int. Cl.⁵ .............................................. G06F 13/00
[52] U.S. Cl. .................................. 395/500; 364/238.3; 364/239.1; 364/244.9; 364/244.6; 364/927.92; 364/927.99; 364/927.97; 364/927.98; 364/939.3; 364/939; 364/DIG. 1; 364/DIG. 2
[58] Field of Search ............... 364/200, 900; 365/230, 365/105; 307/406

[56] References Cited

U.S. PATENT DOCUMENTS

| | | | |
|---|---|---|---|
| 3,566,153 | 2/1971 | Spencer, Jr. | 307/205 |
| 4,006,466 | 2/1977 | Patterson et al. | 364/200 |
| 4,034,354 | 7/1977 | Simmons | 364/900 |
| 4,124,899 | 11/1978 | Birkner et al. | 364/716 |
| 4,127,896 | 11/1978 | Raslavsky | 364/200 |
| 4,144,561 | 3/1979 | Tu et al. | 364/200 |
| 4,156,796 | 5/1979 | O'Neal | 364/900 |
| 4,179,738 | 12/1979 | Fairchild et al. | 364/200 |
| 4,188,665 | 2/1980 | Nagel | 364/200 |
| 4,225,919 | 9/1980 | Kyu | 364/200 |
| 4,254,473 | 3/1981 | Galdun | 364/900 |
| 4,334,157 | 6/1982 | Ferris | 365/205 |
| 4,390,963 | 6/1983 | Puhl et al. | 364/900 |
| 4,393,443 | 7/1983 | Lewis | 364/200 |
| 4,395,754 | 7/1983 | Feissel | 364/200 |
| 4,442,502 | 4/1984 | Friend et al. | 364/200 |
| 4,443,845 | 4/1984 | Hamilton et al. | 364/200 |
| 4,453,229 | 6/1984 | Schaire | 364/900 |
| 4,473,878 | 9/1984 | Zolnowsky | 364/200 |
| 4,485,439 | 11/1984 | Rothstein | 364/200 |
| 4,488,256 | 12/1984 | Zolnowsky | 364/900 |
| 4,570,220 | 2/1986 | Tetrick et al. | 364/200 |
| 4,580,240 | 4/1986 | Watanabe | 364/900 |
| 4,587,609 | 5/1986 | Boudreau et al. | 364/200 |
| 4,591,981 | 5/1986 | Kassabon | 364/200 |
| 4,609,986 | 9/1986 | Hartmann et al. | 364/200 |
| 4,617,479 | 10/1986 | Hartmann et al. | 364/716 |
| 4,625,308 | 11/1986 | Kim | 370/95.3 |
| 4,638,451 | 1/1987 | Hester et al. | 364/900 |
| 4,670,748 | 6/1987 | Williams | 365/230.06 |
| 4,670,855 | 6/1987 | Caprio et al. | 364/900 |
| 4,675,808 | 6/1987 | Grinn | 364/200 |
| 4,701,878 | 10/1987 | Gunkel et al. | 364/900 |
| 4,727,977 | 2/1988 | Gavril | 364/200 |
| 4,751,671 | 6/1988 | Babetski | 364/900 |
| 4,794,558 | 12/1988 | Thompson | 364/900 |
| 4,825,054 | 4/1989 | Rust et al. | 235/380 |
| 4,853,846 | 8/1989 | Johnson | 364/200 |
| 4,920,483 | 4/1990 | Pogue | 364/200 |

FOREIGN PATENT DOCUMENTS 0080823  6/1983  United Kingdom .

OTHER PUBLICATIONS

Bursky, D., "One chip integrates all IBM PS/2 Micro Channel control needs", *Electronic Design*, vol. 36, No. 9, Apr. 1988, pp. 67-69.
International Business Machines Corporation, "Micro-Channel ® Architecture Specification".
International Business Machines Corporation, "IBM ® Personal System/2 ® Seminar Proceedings".
Altera Corporation, "Altera User-Configurable Adapter Interface Chips for PS/2 Micro Channel--EPB2001, EPB2002", Rev. 1.0.

*Primary Examiner*—Thomas C. Lee
*Assistant Examiner*—Eric Coleman
*Attorney, Agent, or Firm*—Jeffrey H. Ingerman

[57] ABSTRACT

A programmable interface for a peripheral circuit card is provided. The card is intended for use with a particular computer bus architecture, and the interface can be customized by a user for a particular card design. Instead of designing a custom interface chip, the designer can program one or more programmable logic devices on the interface chip to interface with whatever devices are on the peripheral circuit card.

19 Claims, 12 Drawing Sheets

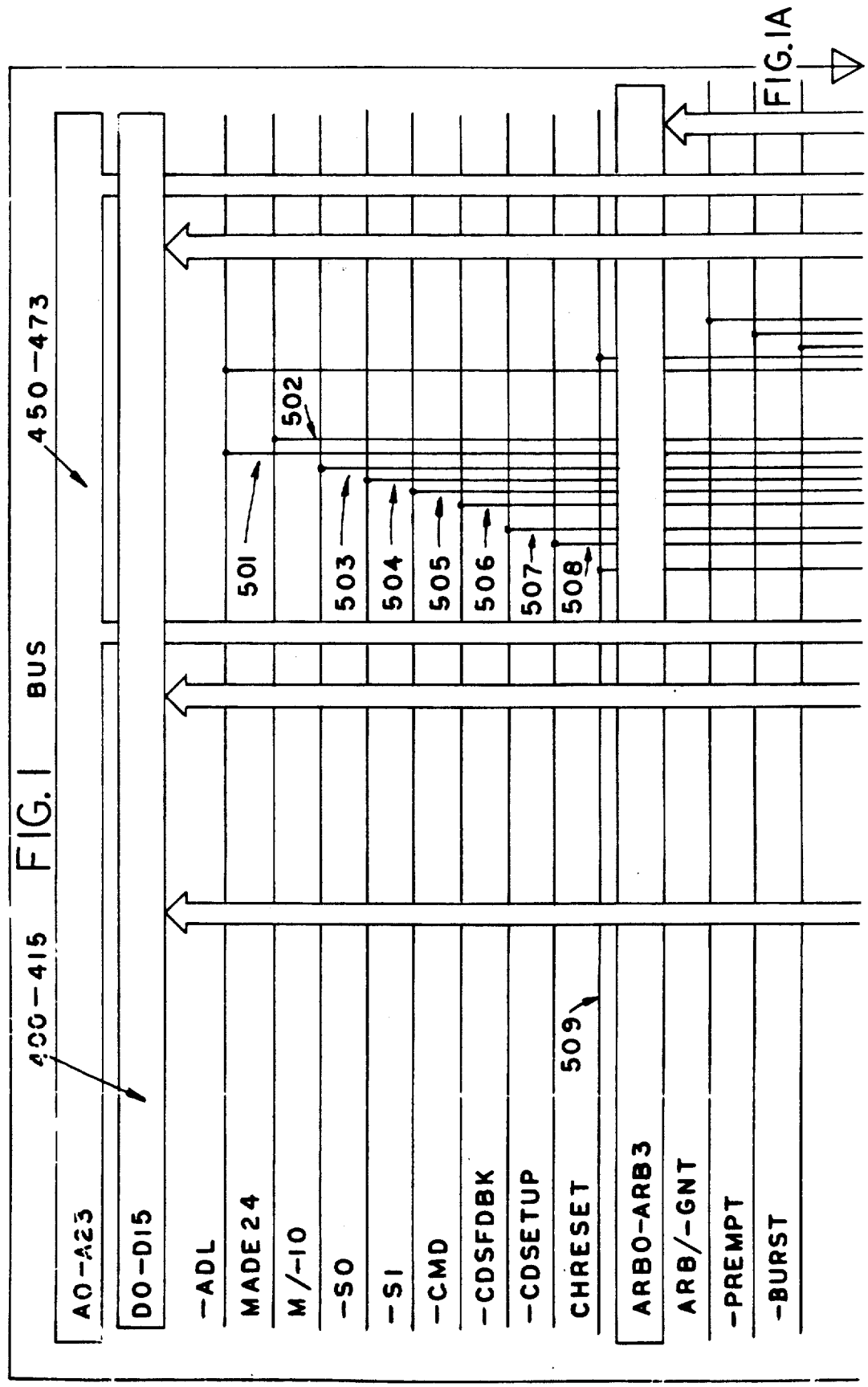

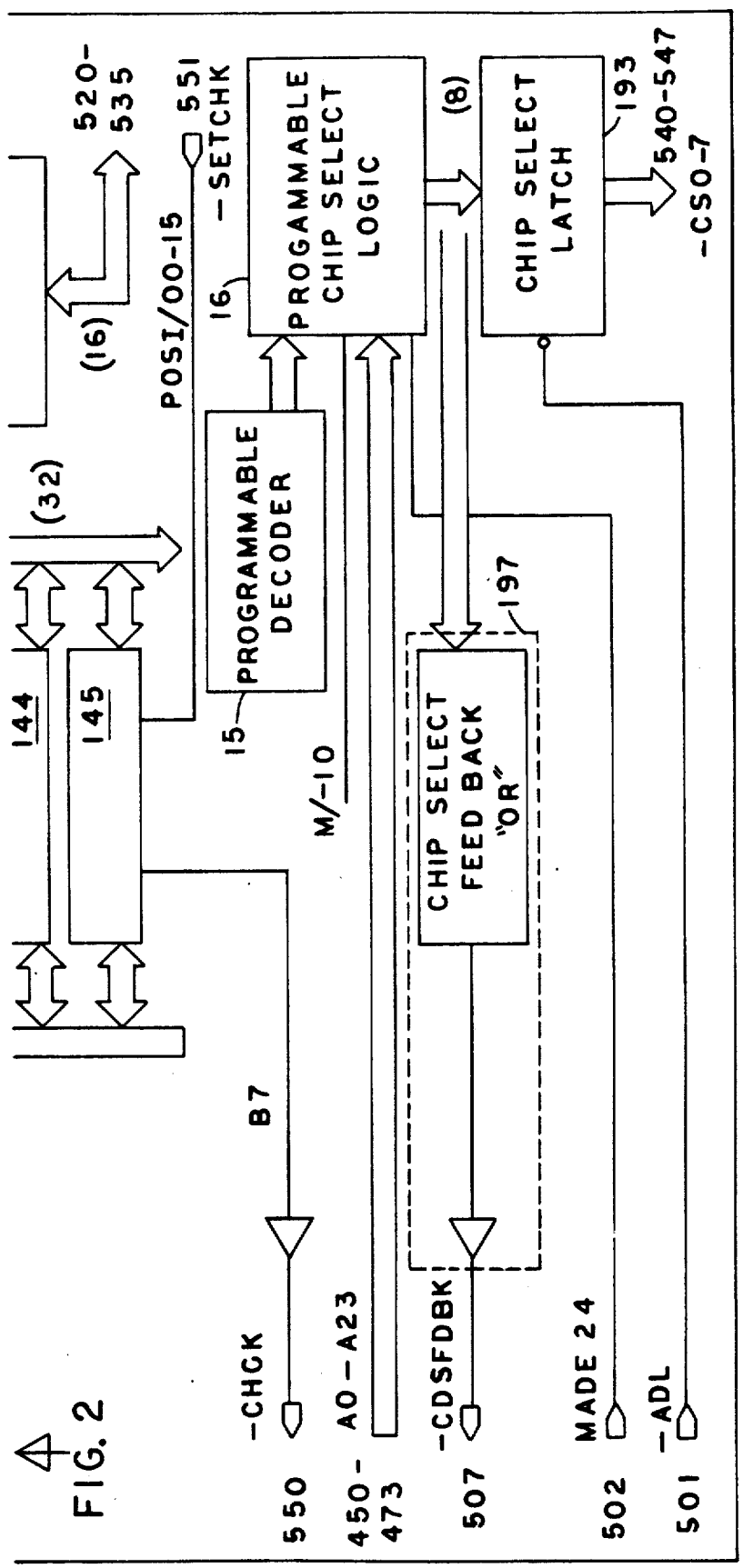

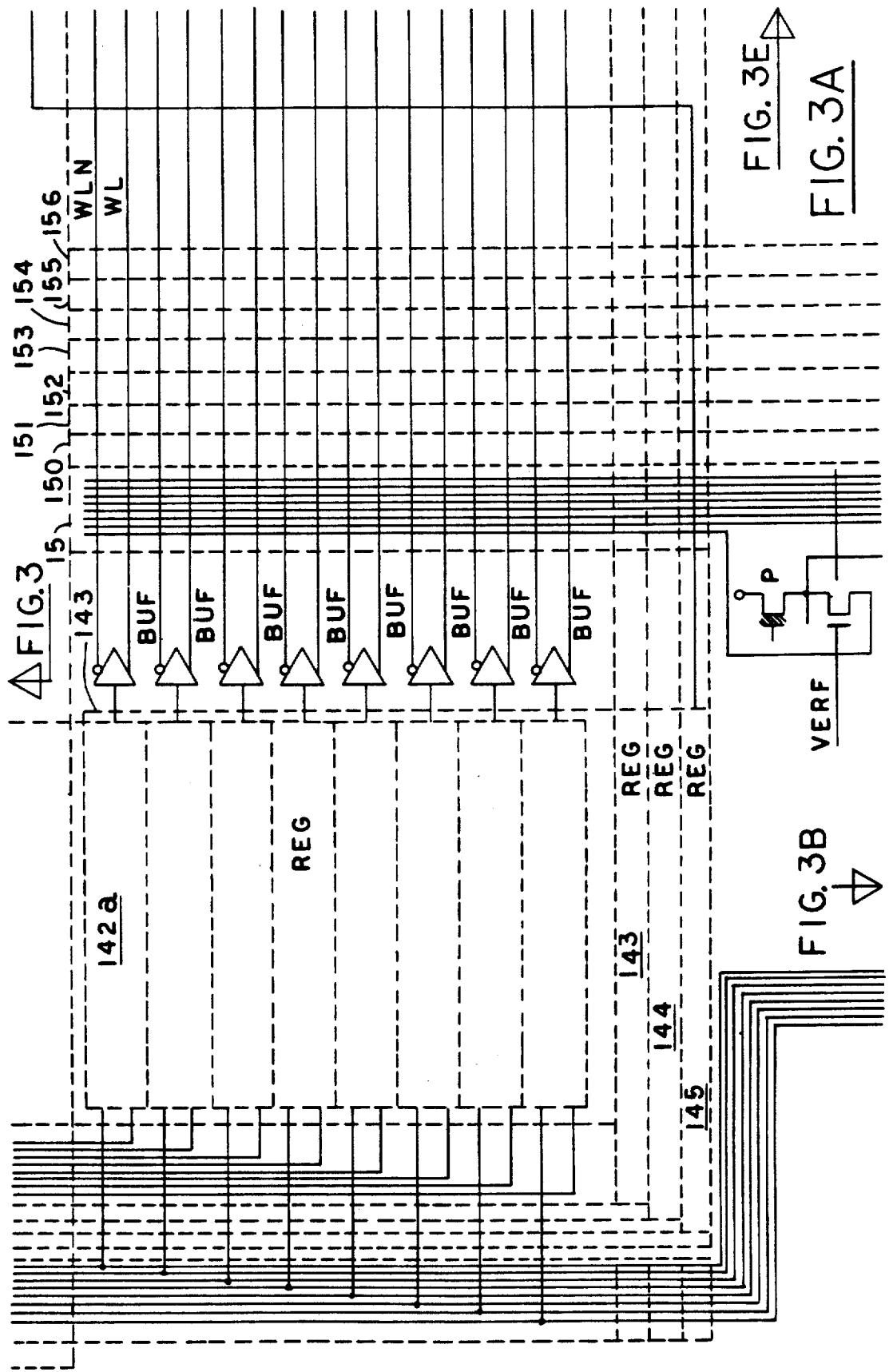

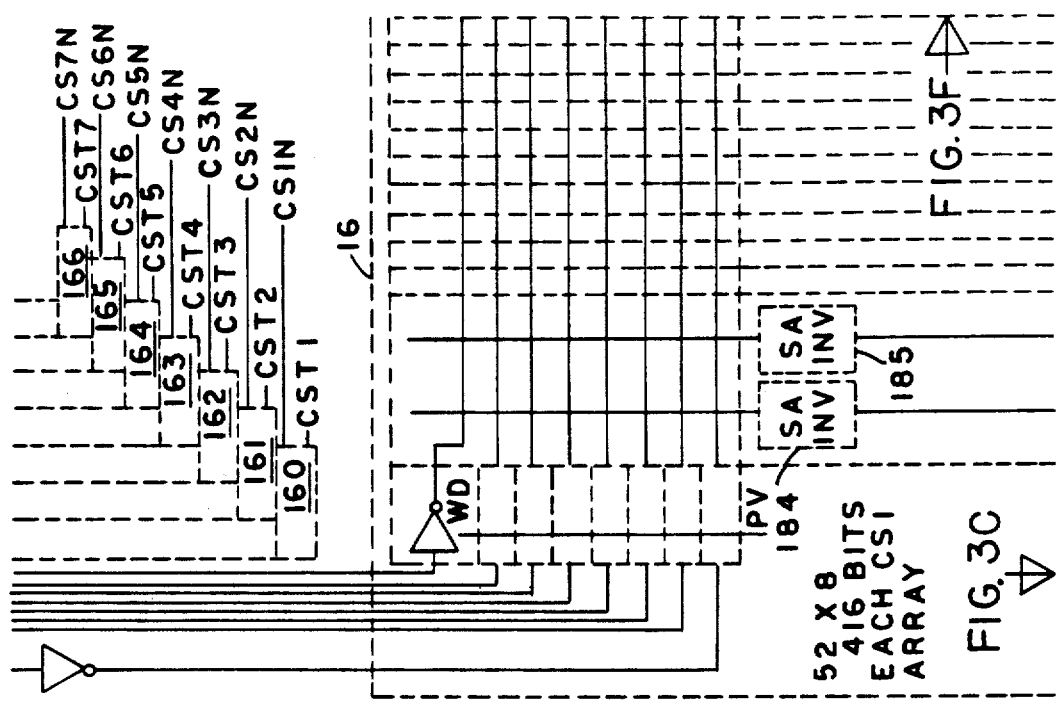
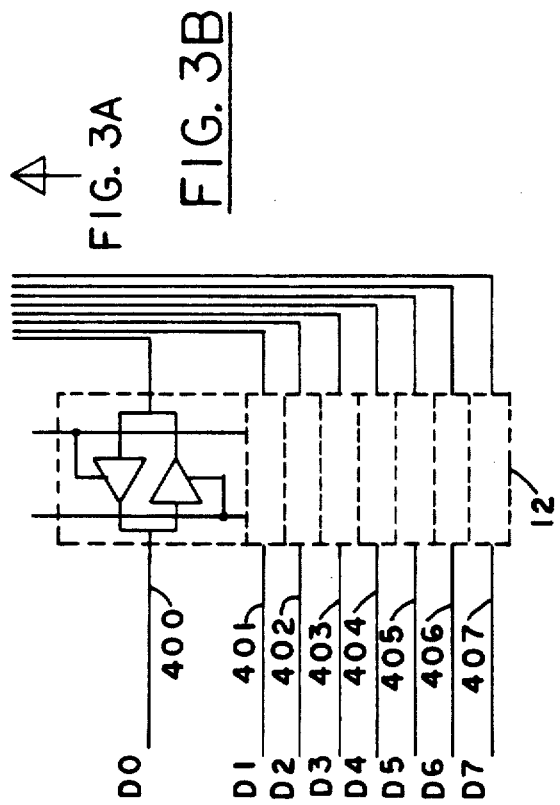

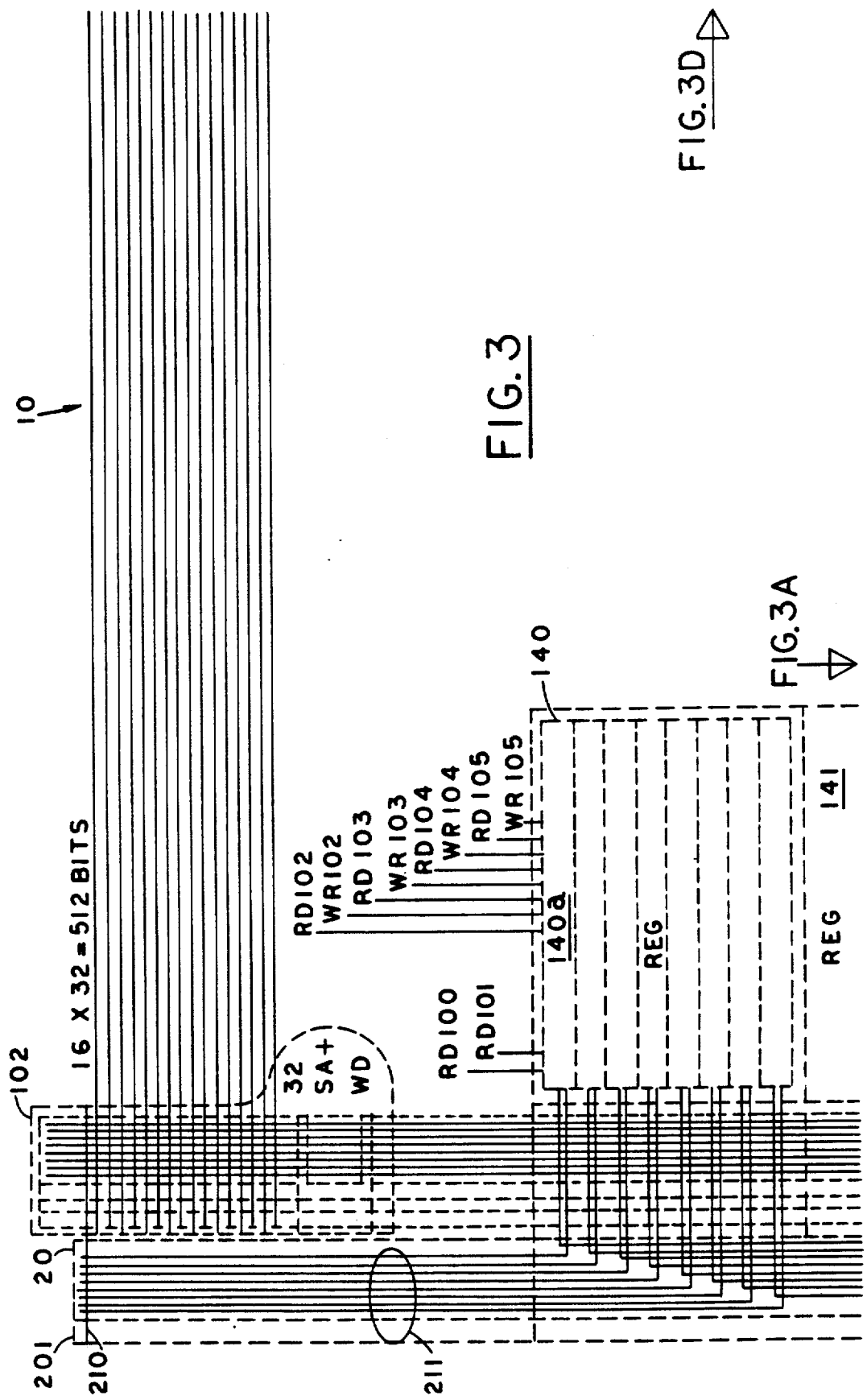

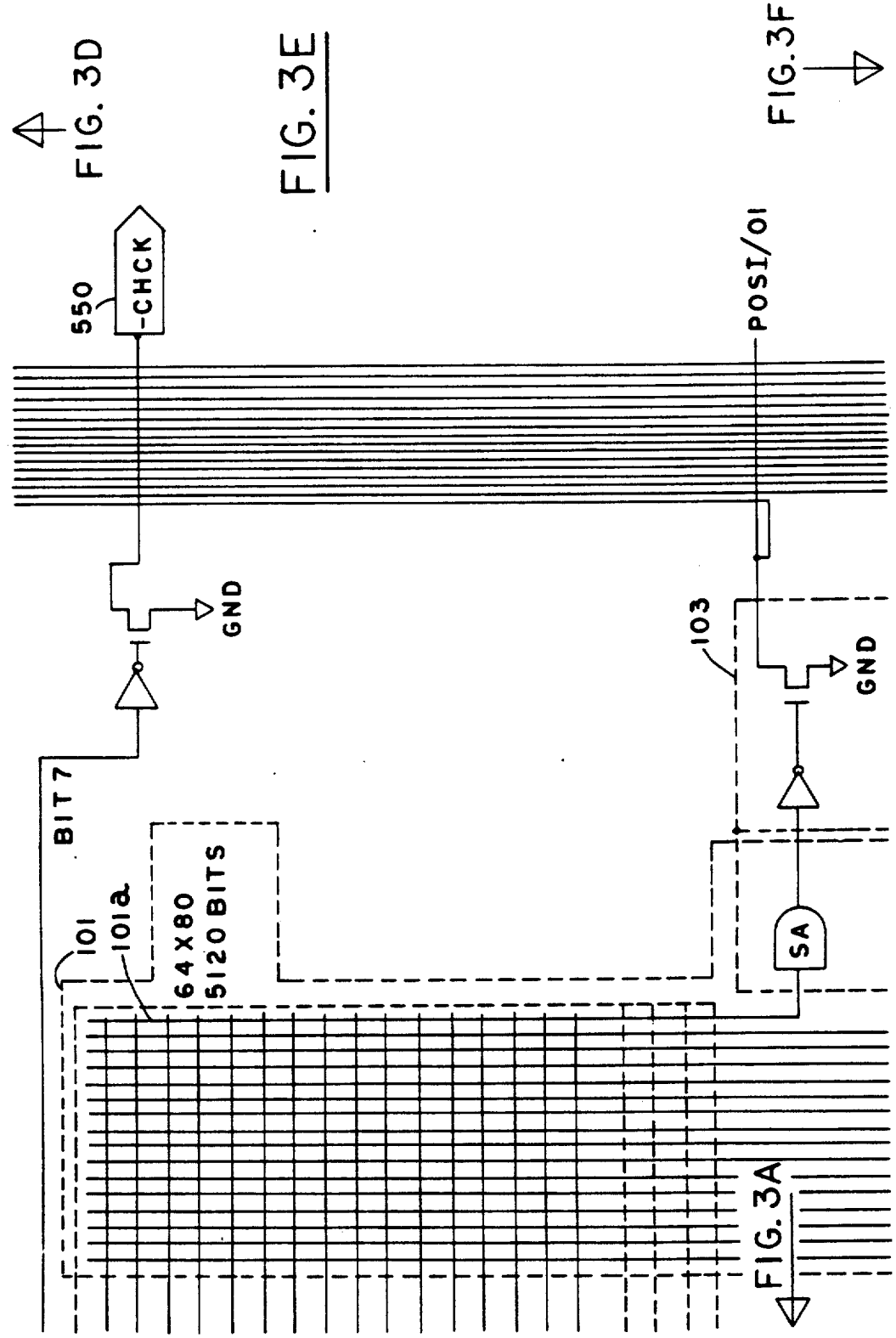

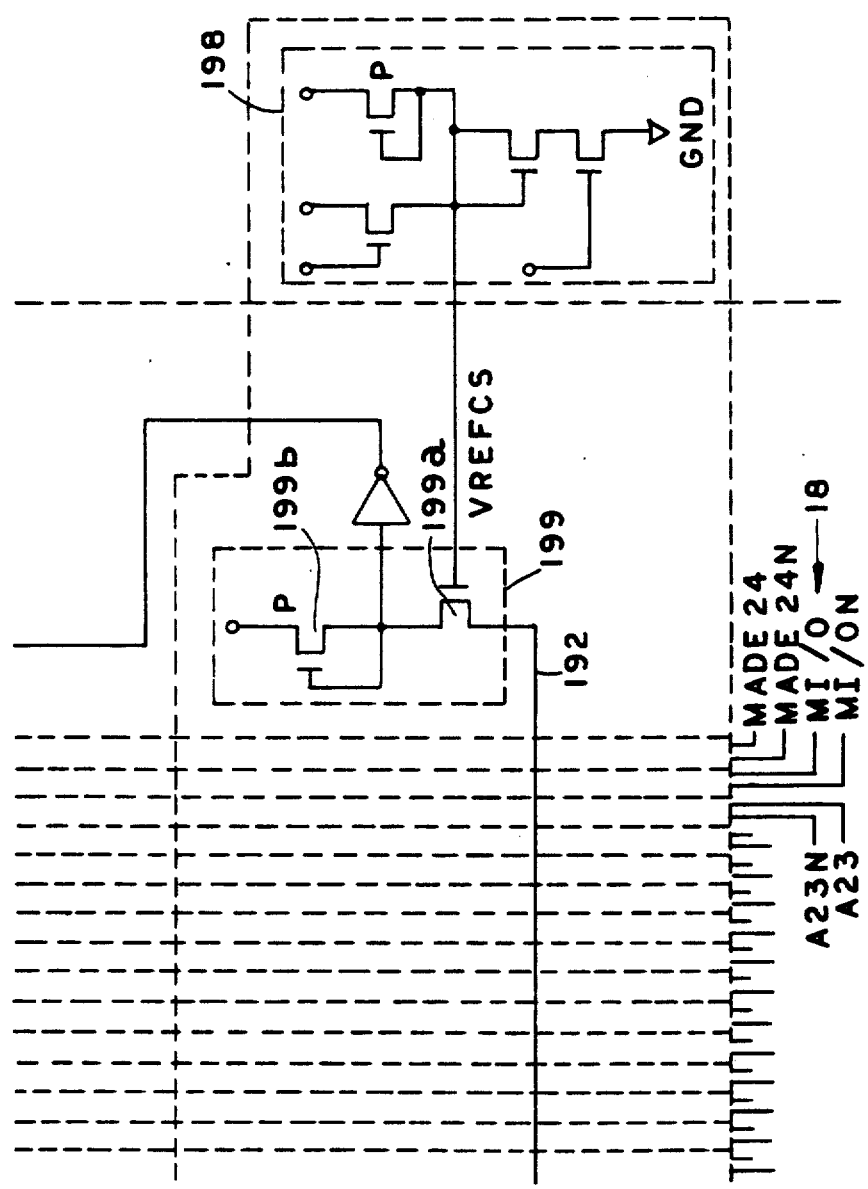

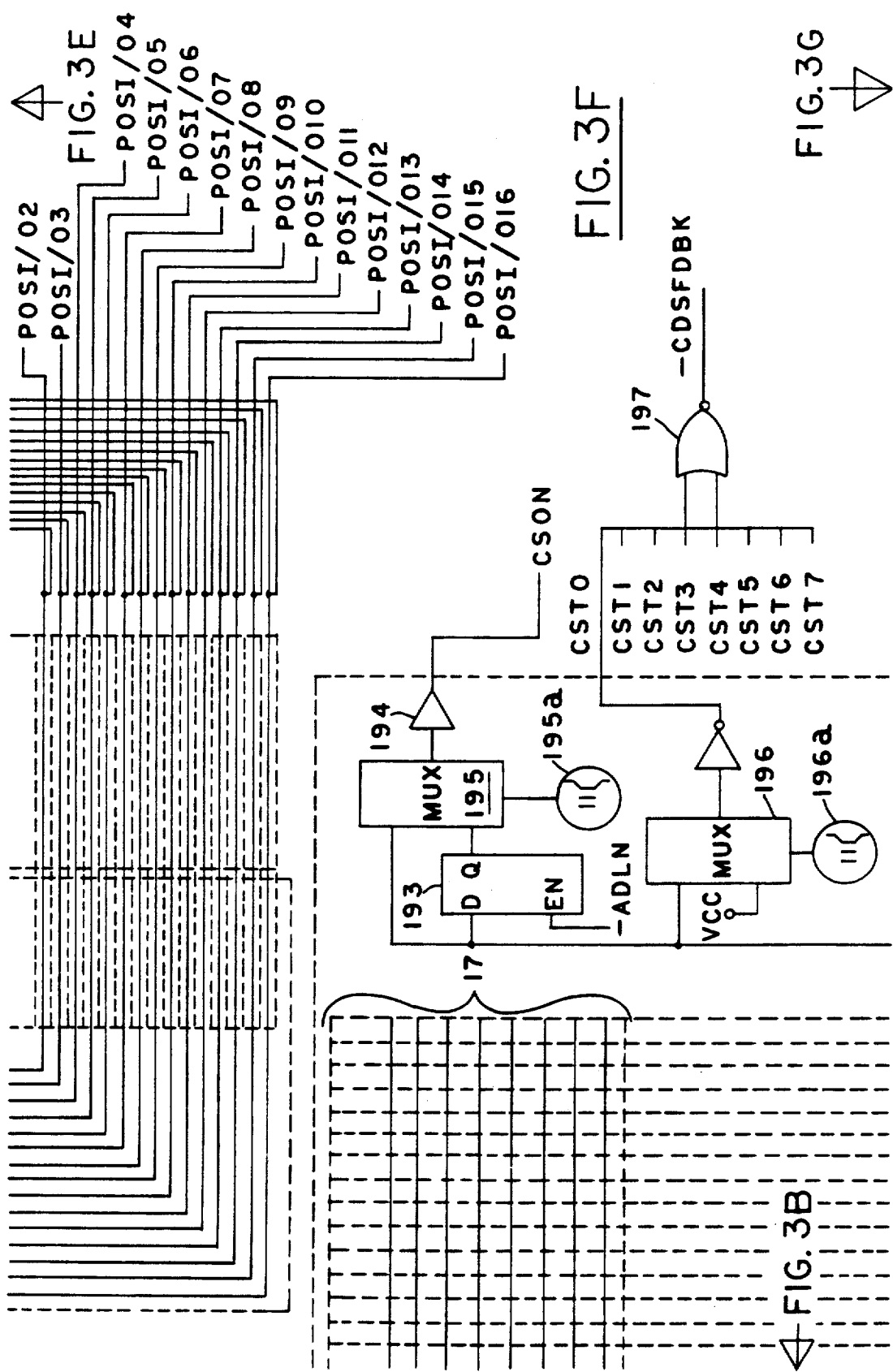

PROGRAMMABLE INTERFACE FOR COMPUTER SYSTEM PERIPHERAL CIRCUIT CARD

BACKGROUND OF THE INVENTION

This invention relates to a programmable interface for peripheral circuit cards in computer systems, particularly personal computer systems. More particularly, this invention relates to such an interface using special-purpose programmable logic devices to enable a designer of peripheral circuit cards to customize the interface to the computer bus for a particular card design.

Computer systems, particularly personal computer systems, typically include (a) a central processor unit which, in the case of a personal computer, is a microprocessor; (b) a main circuit board, including the central processor unit, memory devices and other essential circuits; (c) mass storage devices such as disk drives and associated controller circuits; (d) one or more ports for communication with peripheral devices; and, optionally, (e) one or more printed circuit cards for performing various optional functions, such as additional memory, graphics, communication or storage resources and control. These printed circuit cards will hereafter be referred to as "peripheral circuit cards".

The central processor unit, memory devices, mass storage devices, ports and peripheral circuit cards all communicate with one another over a communications bus under a particular protocol defined by the bus architecture. This communications bus is termed the system bus. This system bus typically will include address, data, control and arbitration control lines. The arbitration control lines allow devices other than the central processor unit to gain control of the bus. In this manner, these devices, termed bus masters, may control the transfer of data across the bus. By asserting appropriate address and control signals on the bus, the central processor unit or other bus master can transfer data from one device or card to another as needed, e.g., from mass storage device to main memory. On such a bus, each device must have a unique address to allow the unique selection of data sources and destinations. Bus conflicts result if addresses are not unique—e.g., two or more devices attempting to transfer data to or from the bus at once.

A representative bus is described in "Micro Channel ® Architecture Specification" and "IBM ® Personal System/2 ® Seminar Proceedings", both available from International Business Machines Corporation. To interface to the described bus, a peripheral circuit card must:

1. Provide an 8-, 16- or 32-bit data interface between the bus and integrated circuits on the card. This is typically implemented by bidirectional, tristatable buffers.
2. Provide an address interface between the bus and integrated circuits on the peripheral circuit card. This typically takes the form of address latches for low-order address lines and the generation of a chip select signal for each of the integrated circuits on the card. The chip select signal is the result of decoding highorder address lines which define the block of addresses a given chip will respond to.
3. Provide a control interface which receives timing and control signals from the bus and generates appropriate control signals for the various integrated circuits on the card to coordinate data transfers. In addition, the control interface generates necessary data transfer handshake lines to insure synchronization with the bus.
4. Optionally, provide an arbitration interface to request use of the bus for data transfers not controlled by the central processor unit. This arbitration interface must obey the bus arbitration protocol established for the bus, including specified resolution of arbitration priorities when multiple peripheral circuit cards request use of the bus simultaneously.

In addition, in the protocol used with the described bus, the system bus is used to initialize the peripheral circuit cards when the system is powered up. This initialization includes the assignment of unique, conflict-free addresses to each card and the configuration of specific card functions.

In order to accomplish this, each peripheral circuit card designed for this bus must have a 16-bit card identification number which is readable by the central processor unit. This card identification number is unique to a particular peripheral card design. It must be stored on the card in a non-volatile manner; that is, when system power is removed, the identication number must be retained for use on subsequent system power-up. When the system is powered up, the central processor unit reads the card identification number for each peripheral circuit card present. It then reads a configuration file stored on the system disk drive associated with the peripheral circuit card identification number detected. The configuration file includes a list of alternative addresses by which the peripheral circuit card can be addressed.

The configuration file also specifies data patterns to be written into special configuration registers on the peripheral circuit card to enable each of the available address ranges. The central processor unit can therefore control the addresses to which each peripheral circuit card responds by writing the appropriate values into the configuration registers. By this means, the central processor unit can eliminate address conflicts between peripheral circuit cards by choosing appropriate, non-conflicting addresses for each card during initialization.

The configuration registers may also be used as software-controlled ports to control specific functions on the peripheral circuit card. In this manner, the central processor unit may control specific system hardware functions. Two of the bits in these registers are specified in the bus specification. One of these bits acts as a peripheral circuit card enable bit—i.e., until this bit is written to a logical "1" by the central processor unit, the peripheral circuit card will remain inactive. Another of these bits acts as a non-maskable interrupt flag, which can be written by the central processor unit with a logical "0" to clear an interrupt condition. Remaining bits in the four 8-bit configuration registers can be used for address selection as described above, or for whatever configuration functions are deemed necessary by the card designer. A given card design will not generally require the use of all remaining register bits, and different card designs may in fact require different sets of register bits.

When a peripheral circuit card is designed and manufactured, the available addresses on the card and the chips to which they correspond can be programmed directly into memory or logic devices in a customized interface on the peripheral circuit card. The contents of selected configuration register bit locations may then be logically decoded and used to enable the various address ranges. However, until a card design is finalized, or until manufacturing volumes reach a critical threshold, it may not be cost-effective to design a customized interface to implement the address assignment and chip select decoding functions.

It would be desirable to be able to provide a programmable interface which can be customized by a user for a particular peripheral circuit card design.

It would also be desirable to make features such as peripheral card identification, chip select address decode ranges, latching of chip selects, chip select/feedback "OR"ing, register bit patterns which enable address range selections, and register/pin connections programmable in a non-volatile fashion. Non-volatile programming of these features would allow the programmable interface to retain the particular characteristics required in a given peripheral circuit card design even when power is removed from the peripheral circuit card and the associated computer system.

SUMMARY OF THE INVENTION

It is an object of this invention to provide a programmable interface which can be customized by a user for a particular peripheral circuit card design.

It is also an object of this invention to make features such as peripheral card identification, chip select address decode ranges, latching of chip selects, chip select/feedback "OR"ing, register bit patterns which enable address range selections, and register/pin connections programmable in a non-volatile fashion. Non-volatile programming of these features allows the programmable interface to retain the particular characteristics required in a given peripheral circuit card design even when power is removed from the peripheral circuit card and the associated computer system.

In accordance with this invention, there is provided a programmable interface for use between a communications bus in a computer system and a peripheral circuit card in the computer system. The peripheral circuit card has configuration registers for indicating to the computer system via the data communications bus various characteristics of the peripheral circuit card. The peripheral circuit card further has at least one application circuit chip thereon. The characteristics in the configuration registers include an address for the at least one chip. The programmable interface includes address input means for supplying to the interface address signals from the communications bus, programmable mask means for storing at least one address range for each of the at least one application circuit chip, comparator means associated with the mask means, means for applying the address signals to the comparator means, and means for generating an enable signal to enable the at least one chip when the address signals match the mask. Thus, the peripheral circuit card can be assembled using the at least one application circuit chip and the programmable interface, without the use of a custom interface.

The preferred embodiment described herein uses erasable programmable read-only memory (EPROM) technology for non-volatile programmable elements. However, it can be seen that alternative non-volatile programmable technologies may be employed and are within the scope of this invention. The programming of such non-volatile programmable circuits may be done prior to peripheral interface chip insertion into the peripheral circuit card using a separate, off-line programming device. This may be done when the programmable element is conventional EPROM, fuse or anti-fuse memory or logic chips. In addition, programming may occur on the peripheral circuit card with the assistance of designated logic, as is possible with electrically-erasable programmable read-only memory (EEPROM) or Flash EPROM. In this manner, the peripheral circuit card designer can pre-configure a programmable interface chip for a particular card design.

The peripheral circuit card identification number is held in programmable, read-only registers for indicating to the computer system via the system bus the card type. In conjunction with data stored on the system disk, various characteristics of the peripheral circuit card may be ascertained by the system. The card furthermore has certain read/write configuration registers which can be used to control the address response ranges of the integrated circuits on the card as well as other card-specific hardware configuration selections.

The programmable interface also includes programmable interconnect means to allow connection of configuration register bits with general-purpose input/output pins. In this manner, any desired bits from the configuration registers may selectively be brought out to interface pins for control of peripheral circuit card functions. Alternatively, peripheral circuit card logic may drive the input/output pins to provide status reporting to the central processor unit when the configuration register data is read.

Thus, the peripheral circuit card can be assembled using the at least one application circuit chip and the programmable interface without the use of a custom interface.

BRIEF DESCRIPTION OF THE DRAWINGS

The above and other objects and advantages of the invention will be apparent upon consideration of the following detailed description, taken in conjunction with the accompanying drawings, in Which like reference characters refer to like parts throughout, and in which:

FIGS. 1 and 1A (hereafter referred to collectively as FIG. 1) are a block diagram of a peripheral circuit card interface incorporating the programmable interface of the present invention;

FIGS. 3 and 3A–3G (hereafter referred to collectively as FIG. 3) are a block diagram of a preferred embodiment of a programmable interface according to the present invention;

FIG. 3 is a schematic diagram of a portion of the programmable interface of FIG. 2;

DETAILED DESCRIPTION OF THE INVENTION

The present invention provides a generic programmable interface for the bus described above. A designer of peripheral circuit cards for use in a computer system having that bus need not have a custom interface made in order to develop the peripheral circuit card. Instead, the peripheral circuit card can be designed using interface chips according to the present invention, programmed by the designer. Once the interface design is finalized along with the rest of the peripheral circuit card, the designer may elect to have a custom interface chip made at that time. However, particularly if the peripheral circuit card is not expected to be manufactured in large quantities, it may be advantageous to use the programmable interface according to the invention even in production versions of the peripheral circuit card.

FIGS. 1-5 represent a preferred embodiment of the programmable interface function of this invention, which provides a programmable interface between a peripheral circuit card and the bus referred to above.

I. Description of the Programmable Interface Function

Figure 1A:
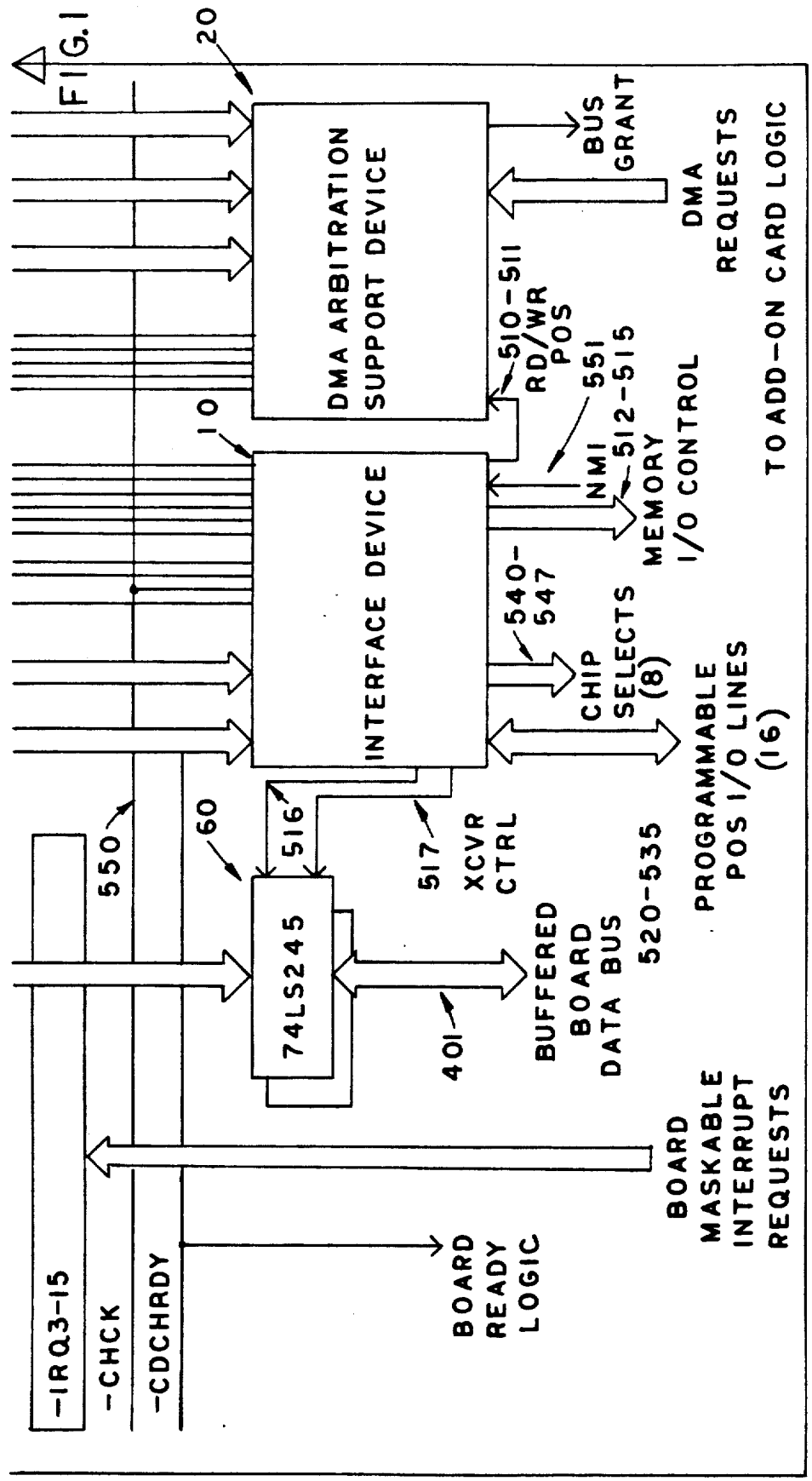

FIG. 1 shows the programmable interface device as incorporated into a typical peripheral circuit card interface to the described bus. The programmable interface device 10 provides the primary address, control signal and configuration interface between the bus and any integrated circuit application chips on the peripheral circuit card. Data transceiver components 60, controlled by the programmable interface 10, provide a data transfer path between the the application chips on the peripheral circuit card and the D0-D15 bus data lines 400-415. One, two or four transceiver components 60 may be used depending on whether the peripheral circuit card has an 8-, 16- or 32-bit buffered board data bus 401. An additional arbitration interface component 20 implements a bus arbitration protocol and allows peripheral circuit card application circuits to request use of the bus for data transfers under the control of alternative bus masters. Component 20 is required for those peripheral circuit cards which need to independently request control of the bus for data transfers.

The address, control and configuration functions of programmable interface 10 involve several different tasks. Control signals 501, 503-506 are decoded, latched and timed by programmable interface 10 as necessary to generate read and write control signals on lines 512-517 for the peripheral circuit card application chips and data transceivers 60.

Programmable interface 10 has a set of configuration registers 140-145 defined by the bus architecture, as described above. These registers are accessible to bus data lines 400-415 through an 8-bit, bidirectional interface 12. Two of the six registers 140-145 are read-only, user-programmable bytes 140-141 used to store the peripheral circuit card identification number. In the preferred embodiment these bits consist of EPROM elements, although it is within the scope of this invention to use EEPROM, fuse, anti-fuse or other non-volatile programmable elements. The remaining four registers 142-145 are readable to, and writable from, the bus and are used to configure a variety of bus architecture-specified peripheral circuit card features, as well as design-specific features defined by the peripheral circuit card designer.

Any of up to sixteen of the 32 bits in the four registers 142-145 mentioned above may be accessed by the peripheral circuit card logic by a set of bidirectional configuration register I/O (input/output) lines 520-535. A particular register bit is associated with a configuration register I/O pin via a user-programmable crosspoint matrix 100 (see FIG. 2). Crosspoint matrix 100 also is programmed in the preferred embodiment using EPROM elements. As a result, rather than wasting programmable peripheral device pins bringing out all potential register bits for peripheral circuit card use, only bits needed for a particular design need be provided.

Programmable interface 10 generates signals on chip select lines 540-547, for selecting the application chips, by decoding user-programmed address ranges. Chip select lines 540-547 may be latched as desired or required by applying the address latch signal −ADL on line 501. Chip select lines 540-547 are used to enable a particular application circuit for a particular address input combination or range of address combinations on A0-A23 address lines 450-473. The user preferably can program multiple (up to 8 in the preferred embodiment) alternative address ranges into the device for each chip select. Selection of a particular address range is accomplished via a user-programmed combination of bits written into configuration registers 142-145 from the bus to configure the interface. In this way, if address conflicts should arise between two or more peripheral circuit cards, the system central processing unit can select alternative, non-conflicting address ranges by writing appropriate values to configuration registers 142-145. A transfer acknowledge output signal called −CDSFDBK is generated on line 507 by programmable interface 10 as a logical NOR by block 197 of user-selected chip select outputs.

The programmable interface provides a peripheral card enable line 518 (−BDENBL) as an output of a specified configuration register bit in accordance with the bus protocol. A non-maskable interrupt line 550 (−CHCK) is also provided to the bus reflecting the state of a specified configuration register bit. This bit, and −CHCK line 550, may be activated by peripheral circuit card logic upon detection of an error condition via a dedicated programmable interface input 551 (−SETCHK).

II. Description of the Preferred Embodiment

Figure 2:
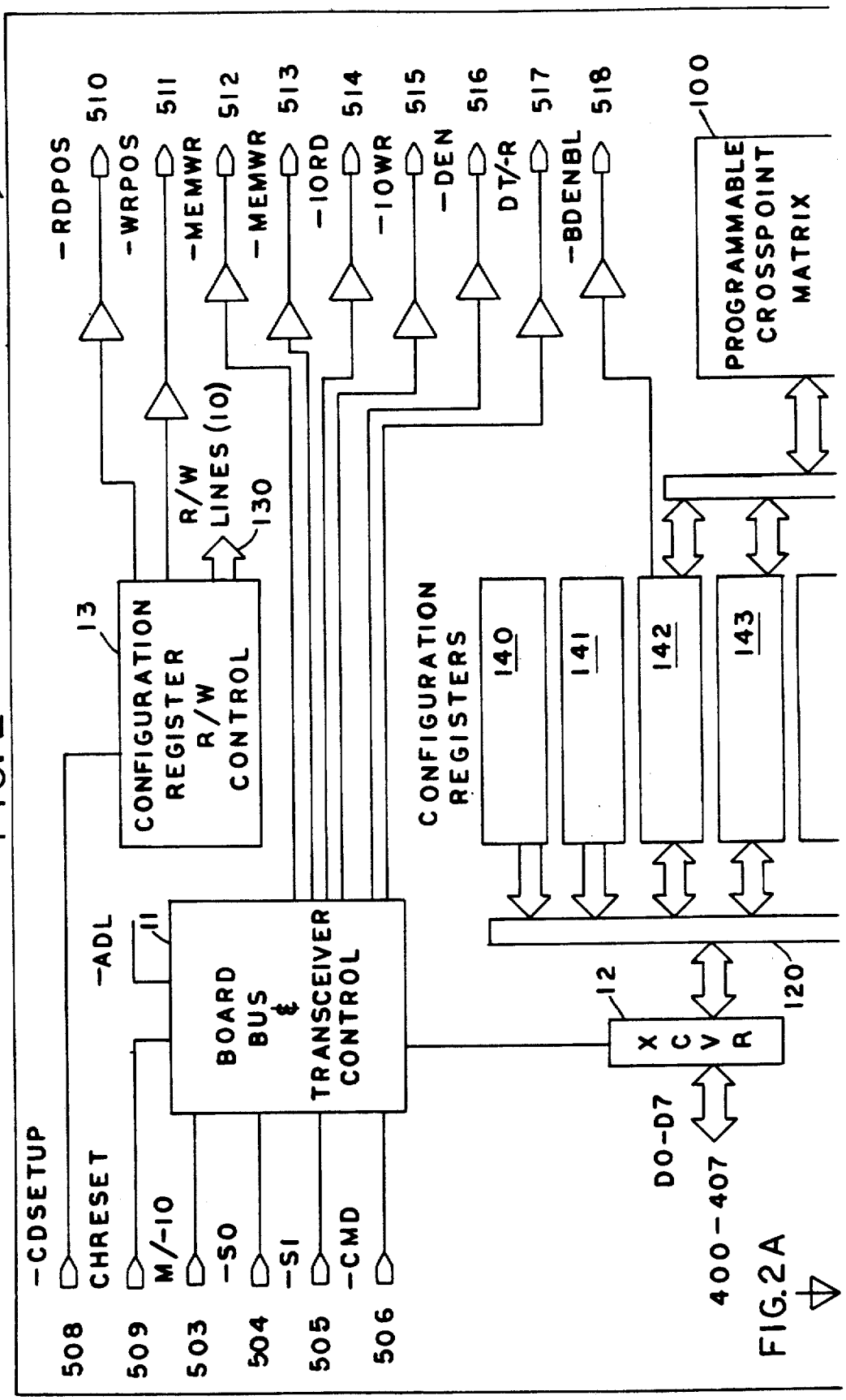
Figure 3C:
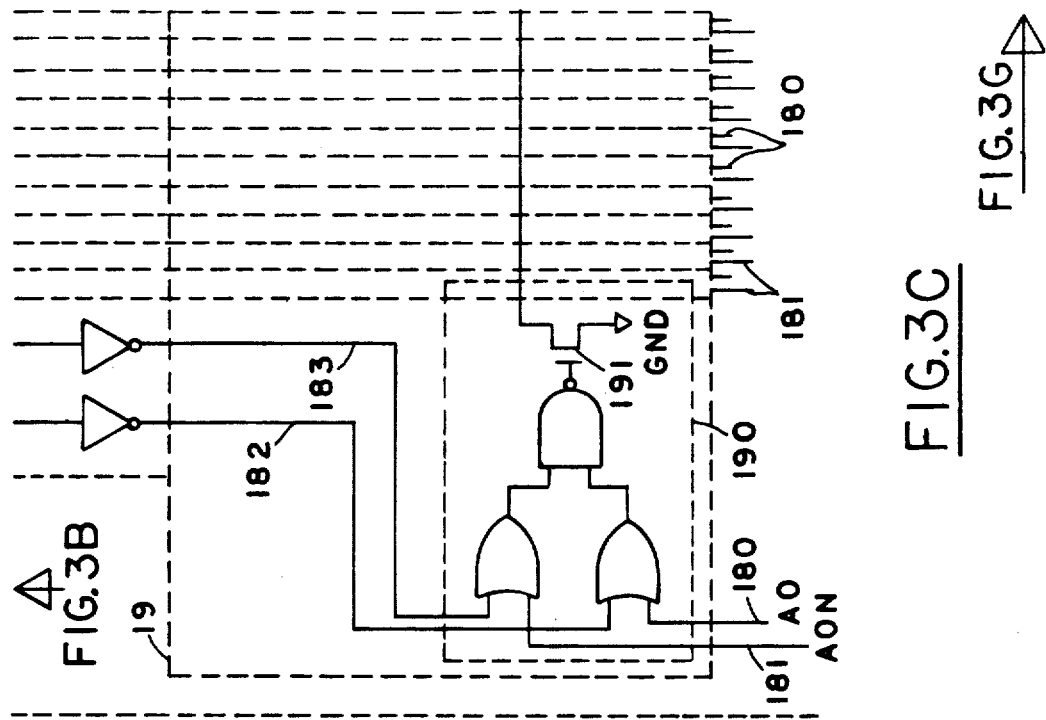
Figures 3, 3D, 3E:
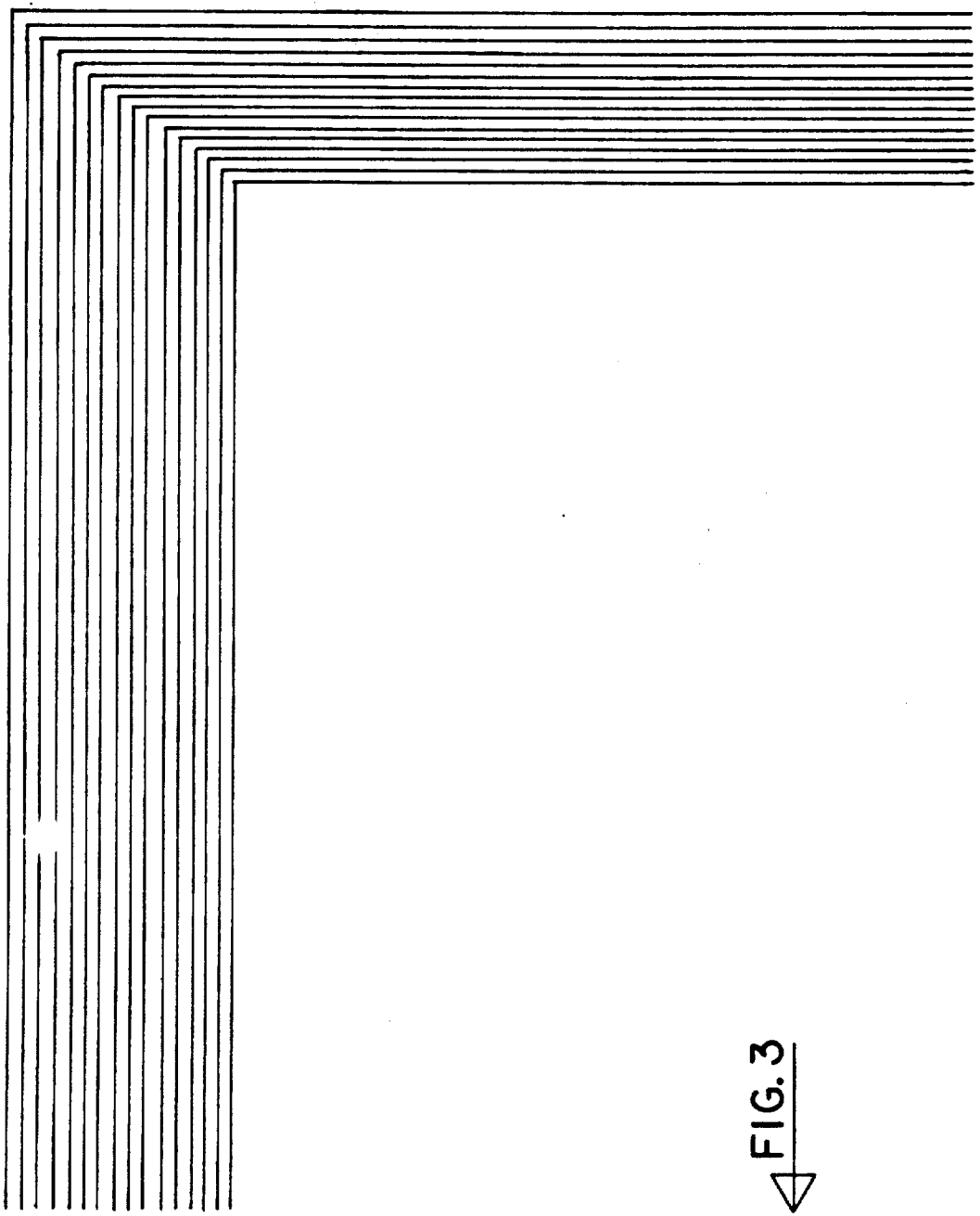

A preferred embodiment of a programmable interface 10 in accordance with the present invention is shown in FIGS. 2 and 3. FIG. 2 is a block diagram of interface 10, in which signal lines on the left side communicate with the bus and signal lines on the right side communicate with the remainder of the peripheral circuit card. For the most part, the signal lines shown, particularly on the left side, are required by the bus architecture described in the publications referred to above.

For purposes of this invention, the important signal lines are as follows:

A0-A23 address lines 450-473 indicate to what address a particular data message is directed. In the bus architecture referred to above, addresses may be either 24 or 32 bits wide. If an address is 32 bits wide, MADE24 signal line 502 will be inactive so that interface 10 can take the appropriate action, which may be to take no action, to assume that the 8 higher order bits are all zeroes, or to take some other action. Of course, it is also possible, and within the scope of this invention, to design a bus interface that accepts all 32 bits of address. D0-D7 data lines 400-407 allow the system microprocessor to read and write the configuration registers.

M/-IO signal 503 is appended to A0-A23 address signals 450-473 to indicate whether the destination address is a memory address or an input/output address. This information is needed in accordance with the referenced bus architecture.

Control of overall communications between the peripheral circuit board including interface 10 and the bus is handled by board bus and transceiver control circuit 11 which, among other things, controls transceiver 12 which is connected between D0-D7 data lines 400-407 and internal data bus 120 of programmable interface 10. Configuration register read/write control circuit 13 controls the setup of the peripheral circuit board by the computer system on power-up, via configuration register read/write lines 130.

As stated in part above, when the computer system is powered up, it reads identification information from configuration registers 140, 141 to identify the peripheral circuit card. Two bytes of card identification number unique to each peripheral circuit card can be read by the system processing unit from configuration registers 140, 141 through the data bus. The card identification numbers must be non-volatile such that after power to the system is turned off, the identification information is still stored on the board for the next and subsequent powerup sequences. In the preferred embodiment EPROM bits are used as non-volatile registers for identification information.

Board identification information is programmed on the EPROM bits at the intersections of word line 210 (horizontal line) and bit lines 211 (vertical lines) in arrays 20, 201. During operation of the interface 10, word line 210 (word line for I/O and identification) is always at logical "1". An erased EPROM bit at the intersection of word line 210 (horizontal line) and bit line 211 results in the bit line being discharged to a logical "0". The logical "0" on the bit line is amplified by the sense amplifier 590 in FIG. 5 (which shows the details of register 140, bit 0 at 140a) and input to tristate buffer 591. When an appropriate internal signal on line 592 is activated, the identification bit information (logical "0") is transferred to the data bus. A programmed EPROM bit will not discharge the bit line to "0". Hence the logical "1" will be transferred through sense amplifer 590 to the input of tristate buffer 591 and to the bus in a similar manner.

By programming selected EPROM bits and leaving other EPROM bits erased in arrays 20, 201, identification information is stored in the non-volatile EPROMs and the bit pattern can be read through the data bus when appropriate read signals are activated.

Once the card has been identified, the computer system retrieves from its mass storage—usually its system disk drive—a file containing configuration information for the card, including permissible address ranges for each integrated circuit device on the card. (The file is provided by the card manufacturer and is loaded onto the system drive when the card is installed.) The system does the same thing for each peripheral circuit card it has, determines a conflict-free combination of addresses, and assigns those addresses by obtaining an appropriate address pointer for each desired address range for each card from the configuration file for each card and writing those pointers into one or more of configuration registers 142-145.

When data are transmitted on the computer system communications bus, the bus interface on each peripheral circuit card decodes the address (A0-A23) associated with that data to determine whether or not the data is intended for that card. Each peripheral circuit card can have several integrated circuit devices on it. Any data transmitted on the system bus is usually intended for only one particular integrated circuit chip or group of chips on one particular card at any one time. Therefore, the bus interface—interface 10 in the case of a peripheral circuit card using the preferred embodiment of the interface of the invention—must decode the address and activate, or enable, one integrated circuit device or group of devices on the peripheral circuit card.

In a dedicated bus interface which is designed for a specific peripheral circuit card, this chip enabling, or "chip select," function is carried out by dedicated circuitry. In interface 10, according to the invention, the chip select function for the first application circuit chip on the peripheral circuit card is carried out by programmable decoder 15 and programmable chip select logic 16. In a dedicated interface, the number of decoders and chip select circuits would exactly match the number of integrated circuit devices on the peripheral circuit board. However, because interface 10 is a generic, programmable interface, programmable decoder 15 and programmable chip select logic 16 are replicated seven additional times as programmable decoders 150-156 and programmable chip select circuits 160-166, as seen in FIG. 3, for a total of eight circuits, allowing up to eight integrated circuit devices or groups of devices with distinct addresses on the peripheral circuit board. Chip select outputs occasionally may be shared by two or more chips connected in parallel on a card. Although the preferred embodiment of interface 10 can accommodate up to eight distinctly addressed integrated circuit devices, a particular peripheral circuit card may in fact have as few as one integrated circuit device or groups of devices. Interface 10 also could be designed to handle a smaller or larger maximum number of integrated circuit devices.

Programmable chip select logic 16, which, as just described, is programmed for a single integrated circuit device or a group of devices on the peripheral circuit card, has a 52 bit by 8 word (416 bits) CMOS EPROM array 17 which stores up to eight words each of which corresponds to a possible active address range for the integrated circuit device. The eight address ranges are selected by the peripheral circuit card designer and are the same address ranges that are provided in the configuration file used by the computer system as described above. Each address is 26 bits wide as described above—A0-A23, M/-IO, and MADE24. Array 17 is 52 bits wide because the addresses entered into it are effectively used as "masks" against which incoming address data are matched. As discussed above, in order to accommodate a "don't care" indication in a position of the mask, as well as ones and zeroes, two bits are required for each address bit.

Incoming address signals are input to programmable chip select logic 16 at 18, with each input 180 and its complement 181 being supplied to comparator 19. Each pair of inputs 180, 181 is provided as an input to comparator 19, part of which is shown in detail at 190. The other inputs to comparator 19 are the stored "mask" values representing the corresponding columns in array 17 for whichever row of array 17 is activated by programmable decoder 15, as discussed below, amplified by sense amplifiers 184, 185.

In order to match a logical 1 in an address, the corresponding mask bits 182, 183 are set to zero and one. To match a logical 0, bits 182, 183 are set to one and zero. For a "don't care" position, bits 182, 183 are both set to one. As can be seen, a mismatch in a bit—a one where a zero is sought or vice-versa—would result in the closing of transistor switch 191, bringing line 192 low. Because all mask bit comparisons are connected in parallel to line 192, a mismatch in any one bit would bring line 192 low. The signal on line 192 is input to sense amplifier 199. N-channel MOS device 199a and p-channel MOS device 199b form sense amplifier 199. Circuit 198 is a voltage biasing circuit generating a volta $V_{REFCS}$ at a level between 0 volts and the $V_{cc}$ supply voltage to the gate of n-channel device 199a. The resulting bias voltage increases the sensitivity of sense amplifier 199. The output of sense amplifier 199 is input to latch 193 and output under the control of —ADL signal 501, referred to above, as a chip select signal at 194. If signal 194 is low, then the chip to which chip select logic 16 corresponds is enabled. Otherwise, that chip is not enabled. Latch 193 holds output 194 low even after the address input at 18 changes, because in some cases the data transfer on lines D0–D7 is not complete when the address input at 18 changes. If it is desired that output 194 not be latched, then programmable element 195a of MUX 195 is programmed to a logical "1" which has the effect of bypassing latch 193, so that output 194 instantaneously reflects any change in line 192.

Line 192 is also fed to a NOR gate 197 along with similar outputs from chip select circuits 160–166. If any one of the integrated circuit devices on the peripheral circuit card is enabled, the output of the NOR gate, available to the bus as the —CDSFDBK signal 507, would go active low. Because the computer operating system knows which card should respond to a particular message, this provides some error checking capability.

In some cases, however, chip select outputs 540–547 may be used to generate useful functions which are not technically chip select signals. In such a case, the peripheral circuit card designer may not want a particular chip select output to contribute to —CDSFDBK signal 507. In that case, programmable element 196a in MUX 196 could be used to signify that line 192 should not be fed to NOR gate 197 by forcing the corresponding CSTx line to a logical "0". For example, chip select outputs may be used to generate latched address outputs for use on the peripheral circuit card by application chips. The chip select blocks may also be used to generate feedback signals to the bus such as —CDDS16, which signals to the bus master that the peripheral circuit card has a 16-bit data interface. Other functions may also be generated as user-programmable outputs of the decoding of appropriate input lines. This might be the case where some of A0–A23 address lines 450–573 are not needed to address any application circuit chips on the peripheral circuit card. In such a case, the designer might want to encode some other information on those signal lines and have them decoded by interface 10. The result would be used on the peripheral circuit card for a function other than chip selection, and one would not want that output to contribute to —CDSFDBK signal 507. In addition, there may be other reasons for a particular chip select output not to contribute to —CDSFDBK signal 507.

The bus control logic 11, 13 includes in particular the —CDSETUP input 508, the —ADL input 501, the —S0 input 504, the —S1 input 505, the —CMD input 506 and the M/—IO input 503 on the bus side, and the —DEN output 516, the DT/—R output 517, the —IOWR output 515, the —IORD output 514, the —MEMWR output 513, the —MEMRD output 512, the —RDPOS output 510 and the —WRPOS output 511 on the peripheral circuit card side. Logic section 11, 13 generates read and write signals 130 for the internal configuration registers 140–145 of programmable interface 10, as well as the peripheral circuit card control signals noted above.

Blocks 11, 13 are "activated" by either an active —CDSETUP line 508 in conjunction with an I/O Read or Write cycle from the processor (indicating a configuration set-up or configuration cycle), or a valid bus cycle (I/O Read or Write, Memory Read or Write) in conjunction with active —CDSFDBK line 507 (indicating a bus cycle for this peripheral circuit card). This assumes the peripheral circuit card has already been enabled. Otherwise, the outputs of this block remain quiescent.

Blocks 11, 13 decode the bus cycles as valid combinations of the —S0 signal 504, the —S1 signal 505 and the M/—IO signal 503. The coding for these signals is:

| M/—IO | —S0 | —S1 | Cycle Type |
| --- | --- | --- | --- |
| 0 | 0 | 0 | No Op |
| 0 | 0 | 1 | I/O Write |
| 0 | 1 | 0 | I/O Read |
| 0 | 1 | 1 | No Op |
| 1 | 0 | 0 | No Op |
| 1 | 0 | 1 | Mem Write |
| 1 | 1 | 0 | Mem Read |
| 1 | 1 | 1 | No Op |

The state of these lines, along with —CDSETUP line 508 and —CDSFDBK line 507, is latched by the leading (falling) edge of —ADL signal 501 from the bus for the duration of the cycle. Either —CDSETUP line 508 or —CDSFDBK line 507 must be active when —ADL line 501 falls for these actions to occur.

The —CMD signal 506 acts as a command strobe and times the generation of the appropriate peripheral circuit card control lines. Therefore, —MEMRD signal 512, —MEMWR signal 513, —IORD signal 514 and —IOWR signal 515 have a duration approximating that of —CMD signal 506. DT/—R line 517 controls the direction of data flow through an external data transceiver 60. The external transceiver allows data to flow between the bus and application chips on the peripheral circuit card. DT/—R line 517 changes state after —ADL line 501 falls, and remains latched for the duration of the cycle. It is low for all write cycles.

—DEN line 516 controls external data transceiver 60 output enables —DEN line 516 is active during a valid Read cycle for essentially the same duration as —CMD line 506. For a Write cycle, however, to give maximum data setup time for the peripheral circuit card, it becomes active a short time after —ADL line 501 falls. It goes inactive after —MEMWR line 513 or —IOWR line 515 goes inactive.

The peripheral circuit card setup or configuration (sometimes called POST for Power-On Self Test) can occur only when —CDSETUP is active on the rising edge of —ADL signal 501 (address latch input from the bus) followed by an I/O read or write cycle. The rising edge of —ADL signal 501 may be used to latch addresses for any type of cycle, and during setup is used to latch A0–A2 lines 450–452 so that the correct configuration register 140–145 may be accessed.

The —RDPOS signal 510 and —WRPOS signal 511 are used to control optional external configuration register functions. They are valid for any configuration register read or write operation during which —CDSETUP signal 508 is active. The timing for these signals approximates that of —IOWR signal 515 and —IORD signal 514.

If CHRESET signal 509 becomes active at any time, any bus cycle in progress is immediately halted and the D0-D7 outputs 400-407 of the programmable interface chip 10 are tristated. Similarly, the peripheral circuit card control lines 510-518 and all chip select latches go immediately to an inactive state.

The configuration file information stored in configuration registers 140-145 is accessible through the dedicated transceiver 12 associated with D0-D7 pins 400-407 on the programmable interface chip 10. Data is transferred to the selected configuration register (during a write operation) while —CMD line 506 is low. The rising edge of —CMD signal 506 latches the input data into the register 142-145. Data is read from the configuration registers 140-145 while —CMD line 506 is low, and will become valid at the D0-D7 pins 400-407 within the period specified below from leading (falling) edge of the —CMD signal 506.

Required configuration registers 140-145 reside in a block at I/O addresses 0100H-0105H for all peripheral circuit cards designed for the bus described above. All registers are byte-wide. Locations 0100H and 0101H are the peripheral circuit card identification number, and are read-only non-volatile EPROM locations. Configuration registers 142-145 are user-defined, with the exception of three bit locations.

Configuration register 142, bit 0, at 142a, is used as a card enable bit for all peripheral circuit cards designed for the bus described above. This bit is reset by CHRESET signal 509, or by the processor writing a logical "0" to this bit during a cycle of —CDSETUP signal 508. When —CDSETUP signal 508 is a logical "0", the programmable interface chip 10 (and peripheral circuit card) will not respond to any normal bus cycles. Only setup reads and writes are allowed. When —CDSETUP signal 508 is set to a logical "1" by the processor, normal bus cycles are enabled. This bit may not be written by normal I/O Write operations to address 0102H (register 142). The —BDENBL signal 518 on the peripheral circuit card side reflects the state of this bit for peripheral circuit card use.

Configuration register 145, bit 7, is used as a channel check flag. A peripheral circuit card reports non-maskable interrupts (NMI) to the processor by activating the —CHCK (channel check) line 550, which is wire-ORed to all cards. On the programmable interface chip an active low pulse on the —SETCHK input 551 will reset bit 7, which is connected to the open drain, 24 mA —CHCK output 550 on the bus, to a logical "0". Bit 7 is set by a CHRESET signal 509 or a write to register 145 with a logical "1" in the bit 7 position. Bit 7 may also be reset by a write to register 145 with logical "0" data in the bit 7 position.

Bit 6 of register 145 indicates whether or not channel check exception status is provided in optional configuration registers (not shown). If used, these registers would typically be implemented in components such as external TTL registers (e.g., 74LS374). If channel check exception status is available, a logical "0" will be found in this location. If channel check exception status is not provided, a logical "1" will be found there. If this bit is used for this purpose on the programmable interface chip 10, one of the programmable POSI/O pins 520-535 on the peripheral circuit card side may be used to force the appropriate value.

All remaining bits are user-defineable. These bits may be used for address remapping control or general input or output port functions on the peripheral circuit card (software-controlled "jumpers" or status bits). Each POSI/O pin 520-535 is independently programmable as input or output, and may be assigned to any bit of any configuration register 142-145. The remapping function will be discussed below.

As discussed above, the chip select logic 16, 160-166 in programmable interface 10 provides up to eight user-programmable chip select outputs 540-547. Each chip select output (—CS0-7) may have up to eight pre-programmed address ranges over which it is active. The granularity of these chip selects may range from one location to the entire 16 megabyte physically available 24-bit address range. Each chip select output may be defined for either memory or I/O mapping. All 24 A0-A23 bus address lines 450-473, MADE24 signal 502, and the M/-IO input 503, enter the programmable logic arrays.

An additional input to the programmable chip select arrays may be provided to act as an enable for the chip select function if so desired. Typically, this input would be connected to the MADE24 bus signal 502, to qualify chip selects when 32-bit addressing is involved.

Normally, chip select outputs 540-547 are not latched in any fashion, and are valid only for the duration of a valid address/M/-IO combination on the bus. Optionally, the chip select outputs may be latched by user-programmable flow-through latches using —ADL signal 501. This may be done on an individual chip select basis. This results in the affected chip select output(s) 540-547 going active a short time after —ADL signal 501 has gone active low (the A0-A23 address lines 450-473 and M/-IO input 503 having stabilized well before —ADL signal 501 falls). The outputs are then latched on the rising edge of —ADL signal 501 and remain active until the next bus cycle (—ADL signal 501 goes low again). Latched/non-latched operation for each chip select output is determined by the user when the device is programmed.

The selection of one of the eight available chip select ranges to be used for a particular chip select output (corresponding to one of the eight words in each of the blocks) is done by user-defined combinations of bits in configuration registers 142-145. A user may define which configuration register bits, and which bit combinations, will activate a given chip select range. This information is coded into a programmable decoder 15 in interface 10 which generates an enable for each range. The operating system may remap address ranges during the POST if there is a conflict, i.e., two cards which might respond to the same address ranges. This is done by changing (writing) the configuration register bits controlling the chip selects, and hence enabling a new address range.

As stated above, the peripheral circuit card designer chooses the allowable address ranges for the various devices on the peripheral circuit card, programs them into array 17, and provides a software file listing the allowable addresses. As stated, the computer system chooses from among the allowable addresses and writes pointers to the chosen addresses into registers 142-145. Interface 10 must decode the contents of registers 142-145 and communicate to chip select logic 16, 160-166 which of the masks in array 17 to use. This function is performed by programmable decoder 15 for the first integrated circuit device on the peripheral circuit card. Decoder 15 is replicated at 150–156 for additional integrated circuit devices on the peripheral circuit card. Decoder 15 is a programmable logic array which reads in the information in registers 142–145 and its complement on its word lines, and sends an enable signal on one of its bit lines to the correct row of array 17. The correct row of array 17 is the one containing the mask of the address corresponding to the address pointer in registers 142–145. Because array 17 is programmable, the enable signal may be activated by any designer-defined pattern of logical 1's, logical 0's, or "Don't Cares" in registers 142–145, so that each bit as well as it complement are required. The programming of the programmable interconnections between the word lines and the bit lines for each decoder 15, 150–156 determines which bit line will be enabled for a particular address pointer stored in registers 142–145.

The connection of any of the 32 configuration register bits with the 16 dedicated POSI/O pins 520–535 on the peripheral circuit card side is controlled by a user-programmable crosspoint switch 100. Each POSI/O pin has an open drain output structure as well as an input path. On the output side, a programmable matrix takes the output of any of the configuration register bits and assigns it to any of the 16 output lines. Since the pins are open drain, if a logical "1" is written to a given configuration register bit from the bus, the associated I/O pin is not driven. This allows the I/O pin to be driven by an external signal source, and subsequently for its value to be read through the corresponding configuration register bit location. Forcing a value from the POSI/O pins does not, however, change the value in the configuration register location (see FIG. 4).

The peripheral circuit card designer may want certain data stored in configuration registers 142–145 to be available to devices on the peripheral circuit card, or to the computer system bus itself. According to the bus architecture described above, the seventh bit in register 145 must be available to the bus as the −CHCK 550 signal, as shown. However, the peripheral circuit card designer may want other data to be available. This function is performed by programmable crosspoint matrix 100. Matrix 100 is divided into two programmable logic arrays 101, 102. Matrix 101 makes data from registers 142–145 available to selected locations on the peripheral circuit card in accordance with the programming of its programmable interconnections, as designed by the peripheral circuit card designer. Matrix 102 similarly makes available certain data, in accordance with its programming, to the computer system data bus, via data lines D0–D7.

Matrix 101 is a programmable crosspoint matrix implemented as a programmable logic array of the type described generally in Spencer, Jr. U.S. Pat. No. 3,566,153, Birkner et al. U.S. Pat. No. 4,124,899, Hartmann et al. U.S. Pat. No. 4,609,986, and Hartmann et al. U.S. Pat. No. 4,617,479, which are hereby incorporated by reference in their entirety. In the preferred embodiment, EPROM technology is used. However, the same function can be achieved by using EEPROM, fuses or non-volatile register cells. Data from each bit of registers 142–145 is connected to the TRUE wordline (WL) and complement wordline (WLN) drivers of the programmable logic array. The TRUE wordlines and complement wordlines are connected to the gates of EPROM devices. The drain connections of the EPROMs are connected to the various bit lines and the logical-NOR function outputs appear on the outputs of the sense amplifiers 103.

In the preferred embodiment of crosspoint matrix 101 using a programmable logic array, all EPROM cells connected to the TRUE wordlines are programmed, so that they do not participate in the logic function. EPROM bits are programmed by the user using an external programmer prior to being used in the system. For embodiments using EEPROMs, in-system programming methods can be employed. In the chip implementing interface 10, it is possible to have data in up to 16 of the 32 bits in registers 142–145 come out of the sixteen POSI/O signals. The crosspoint matrix connection is made by the EPROM cell located in the intersection of the complement wordline and the bit line corresponding to a particular unprogrammed POSI/O. Usually, all other EPROM cells of the bit line are programmed.

Locations of unprogrammed EPROM cells determine which bits of the registers are connected to the output. The following description gives an example of a particular connection.

Referring to matrix 101, assuming one would like to make a cross-point connection of bit 0 of register 142 to POSI/O1. All EPROMs connected to the bit line (101a) corresponding to POSI/O1 would be programmed except the one with its gate connected to the WLN of register 142, bit 0. When data of bit 0 of register 142 is a logic 0, the WLN is a logical "1". A logical "1" on the gate of the erased EPROM cell discharges the bit line, resulting in a logical "0" appearing in the output of sense amplifier 103. Operation of sense amplifier 103 is described below. A logical "1" then appears at the gate of the open drain output driver transistor, thus pulling POSI/O1 to a logical "0".

A logical "1" in bit 0 of register 142 results in a logical "0" on WLN. The corresponding bit line is not discharged to zero, resulting a logical "1" in the output of sense amplifier 103. A logical "0" appears on the gate of open drain output transistor, thus turning the transistor off. In a typical application where the POSI/Ox signal line is used as an output, the line is connected through a pull-up resistor to the power supply. The pull up resistor pulls the POSI/Ox node up to a logical "1".

Figure 4:
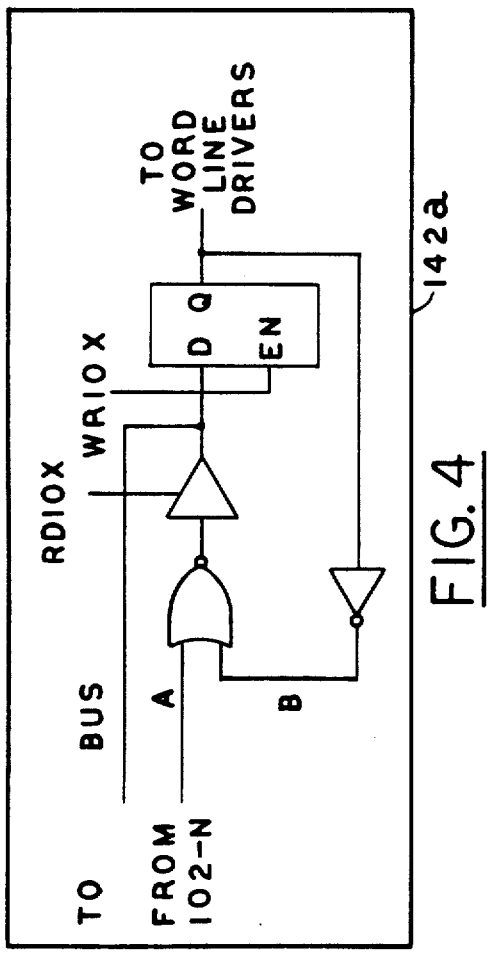
FIG. 4 is a logic schematic diagram of a configuration register bit as implemented in a preferred embodiment of the programmable interface of the invention.
Figure 5:
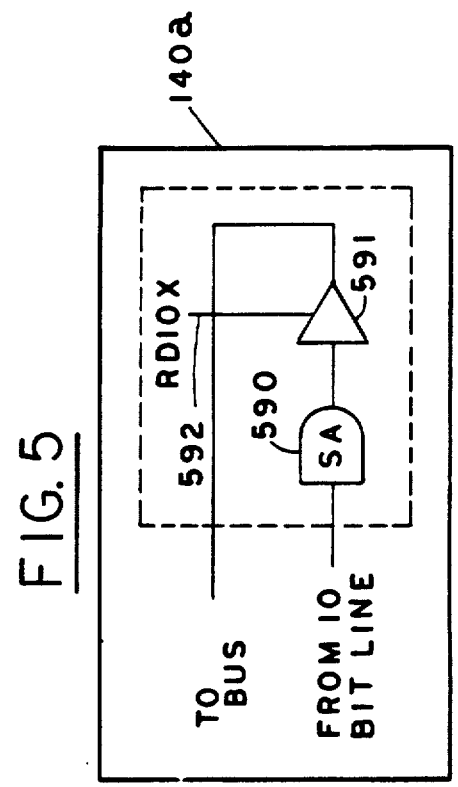
FIG. 5 is a logic schematic diagram of a portion of a configuration register identification bit as implemented in a preferred embodiment of the programmable interface of the invention.

FIG. 4 shows the logic representation of a bit in each register 142–145. When POSI/Ox is selected as an output-only pin, its corresponding EPROM cell in matrix 102, used as an I/O architecture control, is left erased. The logic level at node A in FIG. 4 then is always a logical "0", allowing data Q from the register bit to pass through the tristate buffer to the data bus when the RD10x line is activated.

To configure a POSI/O pin as an input pin, a logical "1" is written into the particular bit of the register associated with a particular POSI/Ox through the crosspoint matrix 101. As described above, that turns off the open drain output transistor, allowing the particular pin to be used as an input line.

An input signal applied to a POSI/Ox configured as an input goes through crosspoint matrix 102. The connection operation through crosspoint matrix 102 is similar to that of matrix 101 described above.

In order to allow the input signal from the POSI/Ox pin to go to the bus, its corresponding architecture control bits in matrix 102 must be programmed, such that its corresponding bit line is allowed to be controlled by the input signal through the matrix 102. The word line for the architecture control bits is word line 210. Node B is at logical "0" due to a logical "1" being written into the register thus allowing the NOR gate to pass and invert the data from the matrix 102.

By conditioning the data in the register, signals can either be written to the data bus from the POSI/Ox pin through crosspoint matrix 102 by writing a logical "1" to the register in a configuration cycle, or data can be read from the bus through the register to the POSI/Ox pin if a logical "0" is written into the register in a configuration cycle.

Programmable devices 15, 17, 101, 102 are all programmable logic devices of the types described generally in Spencer, Jr. U.S. Pat. No. 3,566,153, Birkner et al. U.S. Pat. No. 4,124,899, Hartmann et al. U.S. Pat. No. 4,609,986, and Hartmann et al. U.S. Pat. No. 4,617,479, which are hereby incorporated by reference in their entirety. It is known that the programmable interconnections in such devices can be programmed by addressing the appropriate bit line and word line, applying the desired programming data, and transferring that data to the interconnection by applying to a programming pin a voltage significantly higher than the voltage representing a logical 1—e.g., 12 volts as opposed to 5 volts in a TTL system. For an $m \times n$ logic array, $x = (\log_2 m + 1) + (\log_2 n + 1)$ address lines are needed to address all interconnections uniquely.

Thus it is seen that a programmable interface for a peripheral circuit card for use with a particular bus architecture, which can be customized by a user for a particular card design is provided. One skilled in the art will appreciate that the present invention can be practiced by other than the described embodiments, which are presented for purposes of illustration and not of limitation, and the present invention is limited only by the claims which follow.

What is claimed is:

1. A programmable interface for use in a peripheral circuit card in a computer system for interfacing between said peripheral circuit card and a communications bus in said computer system, said peripheral circuit card having configuration registers for receiving from said computer system via said communications bus various characteristics of said peripheral circuit card, said peripheral circuit card further having at least one application circuit chip thereon, said characteristics including an address pointer for said at least one chip, said programmable interface being capable of being programmed by a user prior to assembling said interface into said peripheral circuit card, said programmable interface comprising:

address input means for supplying address signals to said interface from said communications bus;

data input means for supplying data signals to said interface from said communications bus;

mask means for storing a plurality of alternate user-definable address ranges for each of said at least one application circuit chip, said mask means having mask output means and being an erasable programmable read-only memory capable of being programmed by a user prior to assembling said interface into said peripheral circuit card;

activation means programmable by a user prior to assembling said interface into said peripheral circuit card, said user-programmable activation means being a programmable logic array, for reading said address pointer from said configuration registers for activating that one of said plurality of address ranges stored in said programmable mask means which corresponds to said address pointer from said configuration registers;

comparator means having first and second inputs and an output, said mask output means being coupled to said first input of said comparator means;

means for applying said address signals to said second input of said comparator means; and means connected to said output of said comparator means for generating an enable signal to enable said at least one application circuit chip to act on said data signals when said output of said comparator means indicates that said address signals match said mask; whereby:

said programmable interface is capable of being programmed by programming said user-programmable mask means to store said at least one address range, thereby preparing said interface for assembling into said peripheral circuit card.

2. The programmable interface of claim 1 wherein said erasable programmable read-only memory is a CMOS erasable programmable read-only memory.

3. The programmable interface of claim 1 further comprising user-programmable latch means for, when an address signal is applied to said comparator means and said enable signal generating means generates an enable signal, latching said enable signal if desired by said user until another address signal is applied to said comparator means.

4. The programmable interface of claim 1 wherein:
said address signal comprises a number of bits;
said user-programmable mask means has a number of locations equal to said number of bits, each of said locations comprising two bits; and
each bit of said address signal and its complement are applied to said comparator means; whereby:
said enable signal generating means can distinguish true, false and ignore for each of said bits.

5. The programmable interface of claim 1 wherein:
said peripheral circuit card comprises a plurality of application circuit chips; and
said programmable interface has one of said user-programmable mask means, one of said comparator means, one of said address signal applying means, and one of said enable signal generating means, for each of said plurality of application circuit chips.

6. The programmable interface of claim 1 wherein:
said peripheral circuit card comprises a plurality of application circuit chips; and
said programmable interface ha one of said user-programmable mask means, one of said comparator means, one of said address signal applying means, one of said enable signal generating means, and one of said programmable activation means for each of said plurality of application circuit chips.

7. The programmable interface of claim 1 further comprising feedback signal means for generating a feedback signal if at least one of said at least one enable signal generating means generates an enable signal.

8. The programmable interface of claim 7 further comprising feedback disabling means, programmable by a user prior to assembling said interface into said peripheral circuit card, for preventing, when so programmed by a user prior to assembling said interface into said peripheral circuit card, input to said feedback signal generating means of an enable signal generated by any desired one of said at least one enable signal generating means.

9. The programmable interface of claim 1 further comprising transfer means, programmable by a user prior to assembling said interface into said peripheral circuit card, for transferring data from said configuration registers to at least one of (a) other devices on said peripheral circuit card and (b) said communications bus.

10. The programmable interface of claim 9 wherein said user-programmable transfer means is a programmable crosspoint matrix.

11. The programmable interface of claim 9 further comprising feedback signal means for generating a feedback signal if at least one of said at least one enable signal generating means generates an enable signal.

12. The programmable interface of claim 11 further comprising feedback disabling means, programmable by a user to assembling said interface into said peripheral circuit card, for preventing, when so programmed by a user prior to assembling said interface into said peripheral circuit card, input to said feedback signal generating means of an enable signal generated by any desired one of said at least one enable signal generating means.

13. The programmable interface of claim 1 further comprising means for applying signals other than address signals to said address input means, wherein said mask means is capable of being programmed by a user, prior to assembling said interface into said peripheral circuit card, to decode said signals to perform other than addressing functions, whereby said other signals are decoded by said user-programmable mask means.

14. The programmable interface of claim 13 further comprising feedback signal means for generating a feedback signal if at least one of said at least one enable signal generating means generates an enable signal.

15. The programmable interface of claim 14 further comprising feedback disabling means, programmable by a user prior to assembling said interface into said peripheral circuit card, for preventing, when so programmed by a user prior to assembling said interface into said peripheral circuit card, input to said feedback signal generating means of at least one of (a) an enable signal generated as a result of application to said address input means of said other signals, and (b) an enable signal generated by any desired one of said at least one enable signal generating means.

16. The programmable interface of claim 1 wherein said computer provides said characteristics to said configuration registers based on identification data stored by said interface, said interface further comprising at least one user-programmable storage element for programmably storing said identification data.

17. The programmable interface of claim 16 wherein said user-programmable storage element comprises erasable programmable read-only memory.

18. The programmable interface of claim 17 wherein said user-programmable storage element comprises electrically erasable programmable read-only memory.

19. The programmable interface of claim 16 wherein said user-programmable storage element comprises fusible links.

* * * * *